(12) United States Patent
Schmidt et al.

(10) Patent No.: US 8,521,319 B2
(45) Date of Patent: Aug. 27, 2013

(54) METHOD OF PRODUCING A HOUSING SHELL OR EAR MOLD TO BE WORN IN THE EAR

(75) Inventors: Benjamin Schmidt, Nürnberg (DE); Erwin Singer, Eckental (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 181 days.

(21) Appl. No.: 12/891,981

(22) Filed: Sep. 28, 2010

(65) Prior Publication Data
US 2011/0077760 A1 Mar. 31, 2011

(30) Foreign Application Priority Data
Sep. 28, 2009 (DE) .......................... 10 2009 043 235

(51) Int. Cl.
*G06F 19/00* (2011.01)

(52) U.S. Cl.
USPC ........................................... 700/119; 700/98

(58) Field of Classification Search
USPC ................ 700/95, 97, 98, 117, 118, 119, 120
See application file for complete search history.

(56) References Cited

U.S. PATENT DOCUMENTS

| 5,173,220 | A | 12/1992 | Reiff et al. |
| 5,487,012 | A | 1/1996 | Topholm et al. |
| 6,879,697 | B2 | 4/2005 | Topholm |
| 7,443,992 | B2 | 10/2008 | Fideler |
| 2002/0138237 | A1 | 9/2002 | Topholm |
| 2006/0078638 | A1* | 4/2006 | Holmboe et al. .......... 425/174.4 |
| 2009/0074221 | A1 | 3/2009 | Westermann |
| 2010/0224605 | A1 | 9/2010 | Chua et al. |

FOREIGN PATENT DOCUMENTS

| DE | 10204985 A1 | 8/2003 |
| EP | 1246506 A1 | 10/2002 |
| EP | 2221166 A2 | 8/2010 |
| WO | 0140866 A2 | 6/2001 |

\* cited by examiner

*Primary Examiner* — Carlos Ortiz Rodriguez
(74) *Attorney, Agent, or Firm* — Laurence A. Greenberg; Werner H. Stemer; Ralph E. Locher

(57) ABSTRACT

The production of a hearing aid housing shell or ear mold that can be worn in the ear should be simplified and improved. For this, a prefabricated component, such as a frame for holding an electronics module or a receiver adapter, is positioned in a rapid prototyping instrument. There, the component is integrated into the housing shell or ear mold by the subsequent production of the housing shell or ear mold. This avoids connecting the component to the housing shell or ear mold in a further method step after producing the housing shell or ear mold.

5 Claims, 4 Drawing Sheets

METHOD OF PRODUCING A HOUSING SHELL OR EAR MOLD TO BE WORN IN THE EAR

CROSS-REFERENCE TO RELATED APPLICATION

This application claims the priority, under 35 U.S.C. §119, of German patent application DE 10 2009 043 235.3, filed Sep. 28, 2009; the prior application is herewith incorporated by reference in its entirety.

BACKGROUND OF THE INVENTION

Field of the Invention

The present invention relates to a method for producing, by way of a rapid prototyping method, a housing shell or ear mold (i.e., otoplastic) that can be worn in the ear.

Modern production methods for housing shells or ear molds (otoplastics) of hearing aids use CAD software and rapid prototyping techniques. European patent document EP 0 516 808 B1 describes such a method by means of which the housing shells or ear molds can be fitted to the contours of an auditory canal. According to said document, the outer contours of an ear imprint can be registered with, for example, the aid of laser interferometry or a video camera. In addition, it is also possible for the contours of the auditory canal to be obtained by contactless scanning, e.g. using ultrasound. The obtained data is digitized and converted into a three-dimensional computer display of the outer contours of the housing shell or the ear mold by means of algorithms known from CAD-CAM technology. In the process, the three-dimensional computer model is converted into a succession of cross sections. The housing shell or ear mold is then produced by virtue of the fact that the individual cross-sectional planes are formed one after the other and above one another, below one another or next to one another and are interconnected. By way of example, a stereolithographic or similar method can be used in this work step.

A stereolithographic method (SLA method) can for example be carried out such that a container with activated liquid synthetic resin is arranged on a computer-controlled moveable platform. The targeted use of radiation directed on the surface of the liquid synthetic resin, which radiation brings about part-polymerization of said synthetic resin, can create a first cross-sectional surface of the ear mold. Subsequently, in each case after the completion of a cross-sectional surface, it is necessary for the platform to be lowered by the thickness of one layer so that the next cross-sectional plane can be created in the same fashion on the surface of the liquid synthetic resin. This is continued until finally the at least partly polymerized mold can be removed from the container.

In addition to the SLA method, there are a number of additional rapid prototyping methods suitable for producing hearing aid housing shells or ear molds. By way of example, selective laser sintering (SLS method), direct light processing (DLP) and 3D printing are also mentioned here in this respect.

Only a few plastics are suitable for such production methods. The material properties of these plastics often do not satisfy all the demands on the hearing aid shells or ear molds. Thus, the plastics suitable for the stereolithographic production method are generally very hard, and in some cases brittle as well, which is why hearing aid components often cannot be attached directly onto the housing shell or ear mold.

Semi-modular hearing aids to be worn in the ear generally comprise a housing shell and an electronics module. Due to the aforementioned material properties and component tolerances in the shell production, it is currently not possible for the housing shell made using a rapid prototyping method to assume the function of the module support for the electronics module. Thus, an additional module support is produced in current production methods, usually as a plastics injection-mold part, and adhesively bonded to the housing shell in an additional work step.

There is similar behavior in the case of receivers arranged in the housing shells or ear molds. These receivers cannot be connected directly to the relevant housing shells or ear molds either for the aforementioned reasons, but only in conjunction with a receiver adaptor. This too is generally a separately produced plastics injection-mold part, which was previously bonded into the relevant housing shell or ear mold in an additional work step.

United States patent application publication US 2009/0074221 A1 describes a behind-the-ear hearing aid (BTE) with an individually shaped housing. The housing can consist of two parts, which are made together in a rapid prototyping process.

SUMMARY OF THE INVENTION

It is accordingly an object of the invention to provide a method of producing a hearing aid housing shell or an otoplastic to be worn in the ear which overcome the above-mentioned disadvantages of the heretofore-known devices and methods of this general type and which simplifies and improves the production of a housing shell or ear mold to be worn in the ear.

With the foregoing and other objects in view there is provided, in accordance with the invention, a method for producing a housing shell or an ear mold to be worn in the ear, the method which comprises:

providing CAD data of a three-dimensional shape of the housing shell or ear mold to be produced;

providing CAD data of a three-dimensional shape of a prefabricated component to be connected to the housing shell or ear mold;

subjecting the component and the housing shell or ear mold to virtual positioning relative to one another;

providing the prefabricated component and placing the component in a rapid prototyping instrument for forming the housing shell or ear mold by a rapid prototyping process; and building the housing shell or ear mold with the rapid prototyping process and thereby embedding the prefabricated component at least partly.

In other words, according to the invention where a housing shell or ear mold to be worn in the ear is produced, CAD data is first of all provided of a three-dimensional shape of the housing shell or ear mold. CAD data is likewise also provided of a three-dimensional shape of a prefabricated component to be connected to the housing shell or ear mold, more particularly a frame for holding and attaching an electronics module or a receiver adaptor for the connection to a receiver. Subsequently, the component is positioned in relation to the housing shell or ear mold in a virtual fashion, in particular with the object of building hearing aids that are as small as possible.

Once the housing shell or ear mold with the component connected thereto is available in the computer model, the actual production is brought about. For this, the already prefabricated component is first of all provided in the rapid prototyping instrument for carrying out the rapid prototyping method in a suitable fashion. In the process, care has to be taken in particular that the component is positioned and aligned in a precise fashion in the rapid prototyping instrument so that the component is actually also in the envisaged position and alignment in the housing shell or ear mold at a later stage. The housing shell or ear mold is subsequently built by the rapid prototyping method, around the component as it were, while at least partly embedding the component. Hence, the component is integrated in the housing shell or ear mold.

The advantage offered by the invention is that of dispensing with bonding the component into the housing shell or ear mold and thus simplifying the production process.

If the component inserted according to the invention is used to hold a further component, e.g. an electronics module or a receiver, this offers, over a direct connection between the further component and the housing shell or ear mold, the advantage of allowing a very precise fit between the component and the further component. Furthermore, there is less load on the housing shell or ear mold than would be in the case of a direct connection (e.g. by means of latching or snap-fit connection) to the further component. Moreover, the invention allows the realization of smaller designs than would be possible using the conventional production method.

Of course the production method according to the invention also allows the simultaneous introduction of a plurality of components into a housing shell or ear mold. Moreover, the production method according to the invention also allows many housing shells and/or ear molds to be produced simultaneously in a rapid prototyping instrument, as is conventional in shell production.

For the purpose of precise positioning of the component or a plurality of components, each component is attached to a support such that the precise position and alignment of each relevant component is known at the support situated in the rapid prototyping instrument. The support is advantageously equipped for this with suitable positioning aids and/or markings that can be registered by the rapid prototyping instrument in order to recognize the positioning of the support and the components automatically. Only a precise determination of the position of a component in the rapid prototyping instrument also allows exact positioning of the component in the housing shell or ear mold.

There are a plurality of options for connecting the prefabricated component with the housing shell or ear mold during the production:

In one variant, a connecting layer for connecting the component to the housing shell or ear mold is first of all applied onto the component in a method step before the housing shell or ear mold is produced. The connecting layer is for example embodied as an adhesive layer or lacquer and brings about bonding between the component and the finished housing shell or ear mold.

Additionally, it is also possible for there to be an interlocking connection between the housing shell or ear mold and the component. For this, the component comprises attachments or recesses that, in combination with corresponding attachments or recesses with an inverted design in the housing shell or ear mold, lead to a permanent interlocking connection between the housing shell or ear mold and the component.

In one embodiment of the invention, the attachment and/or the component itself is at least partly produced from a transparent material, and so it can be transilluminated in said region during the production of the housing shell or ear mold. This is advantageous particularly when using a fixedly positioned laser because this also allows the shell to be built up in a region otherwise shadowed from the laser by the component.

Other features which are considered as characteristic for the invention are set forth in the appended claims.

Although the invention is illustrated and described herein as embodied in a housing shell or ear mold that can be worn in the ear, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
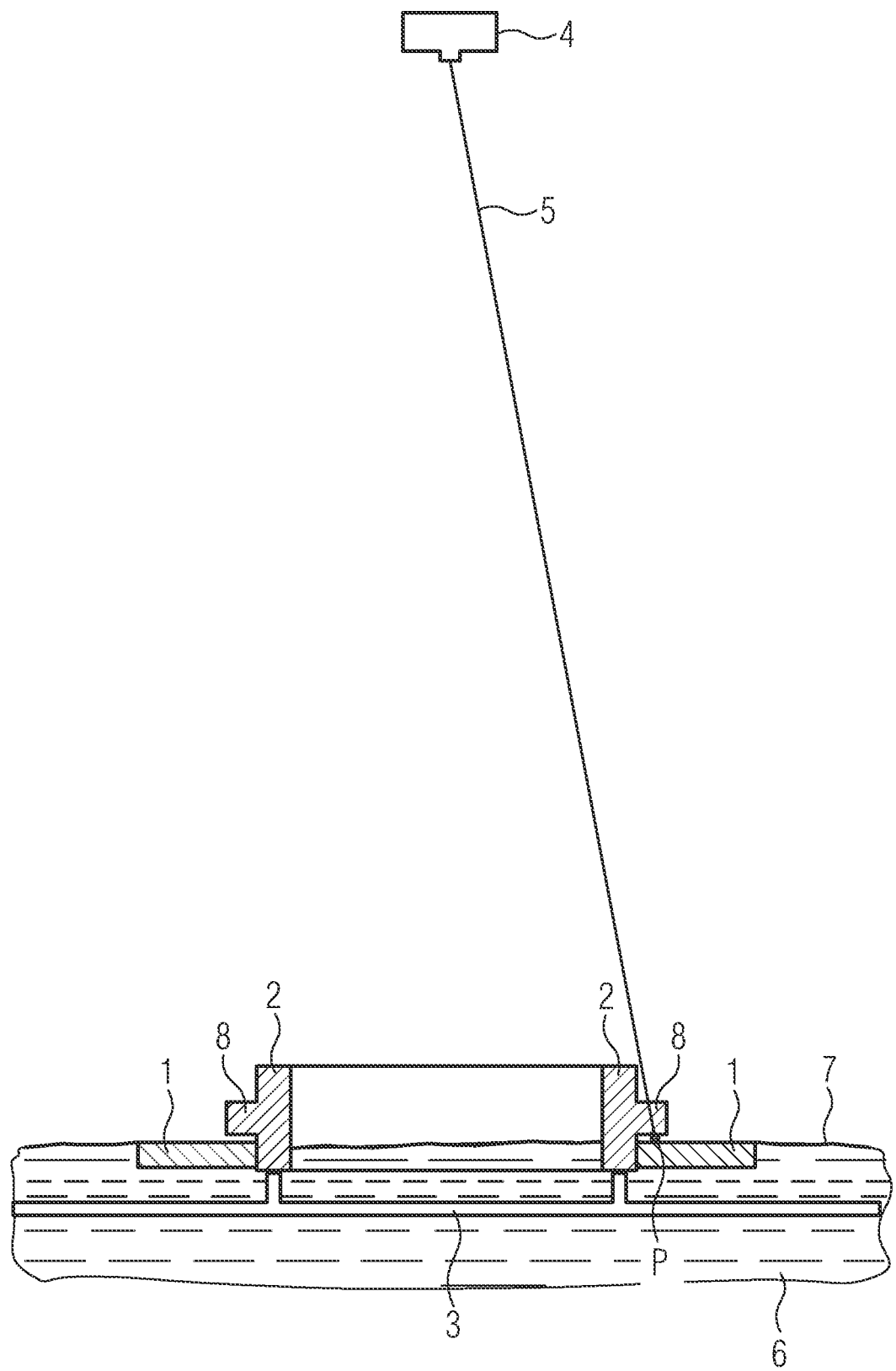
FIG. 1 shows the start of the production of a housing shell of an in-the-ear hearing aid with a frame for holding an electronics module.

Referring now to the figures of the drawing in detail and first, particularly, to FIG. 1 thereof, there is shown a very much simplified schematic illustration of the start of the production of a housing shell 1 of an in-the-ear hearing aid. Here, a support 3 with a prefabricated frame 2, which has an attachment 8 and into which a non-illustrated electronics module can be inserted, is situated in a container of a rapid prototyping instrument. The container furthermore contains a liquid 6 that can be cured by laser light. A laser 4 emits a controlled laser beam 5 and the latter is incident on the surface 7 of the liquid 6 at the point P, as a result of which said liquid cures at the point P. The frame 2 and the attachment 8 thereof are produced from transparent material such that the laser beam 5 can penetrate these in an almost unhindered fashion. This allows the housing shell 1 to be built up under the attachment 8 as well. A step-wise increase in the liquid level or a step-wise lowering of already created shell regions into the liquid results in a layered shell design. This is how the part of the housing shell 1 already visible in FIG. 1 was created.

Figure 2:
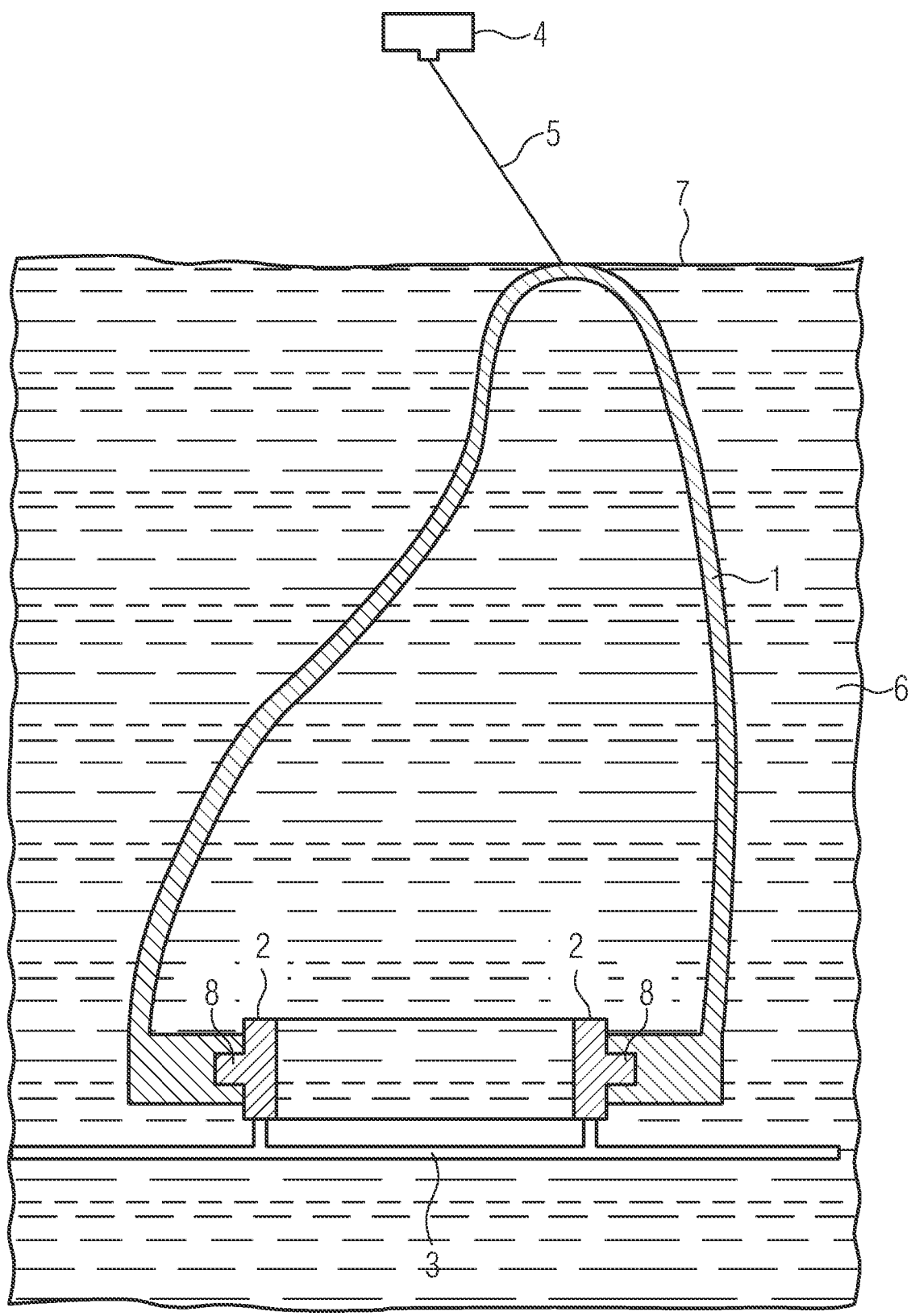
FIG. 2 shows the production of the housing shell at an advanced time during the production process.

FIG. 2 shows the production according to this principle of the housing shell 1 at a very advanced time in the production process. It is evident from FIG. 2 that the frame 2 is fixedly and permanently integrated into the housing shell 1 as a result of this production process. In order to improve the connection between the housing shell 1 and the frame part 2, the latter and more particularly the attachment 8 thereof can be coated with a lacquer or an adhesive that also bonds to the shell material. In addition to the interlocking connection, this also results in an integral connection between the housing shell 1 and the frame 2.

Figure 3:
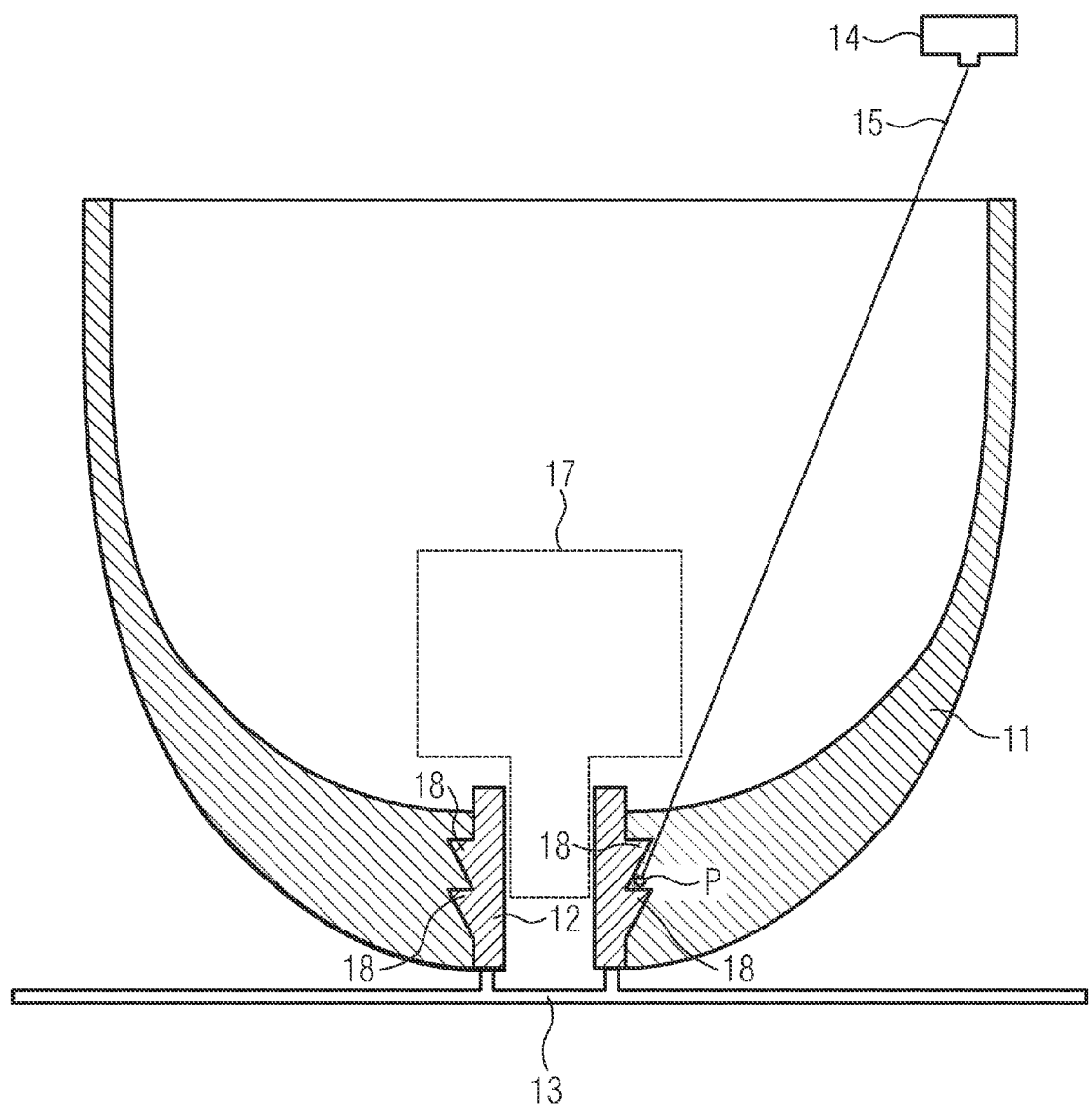
FIG. 3 shows an ear mold with an integrated receiver adapter.

A further example of a production method according to the invention is illustrated in FIG. 3. There, there is shown an ear mold 11 to be worn in the ear of a behind-the-ear hearing aid. A receiver adaptor 12 is integrated into the ear mold 11 for connecting the ear mold 11 to a receiver 17. Here, the production is to a large extent analogous to that of the exemplary embodiment as per FIGS. 1 and 2. However, a second figure was dispensed with here for simplicity, and the position of the curing point P is drawn in the already finished ear mold, without this being detrimental to the understanding. Just like in the preceding exemplary embodiment, a component, namely the receiver adaptor 12, is first of all also mounted on a support 13 in this case and positioned in a precise fashion in a rapid prototyping instrument. Subsequently, there is computer-controlled irradiation of a curable liquid by the laser 14, by means of which the liquid is cured at the point at which the laser beam 15 impinges on the surface of the liquid. The curing of the liquid at the point P is also brought about in this case at a time at which layers of the ear mold 11 situated above the point P have not yet been formed.

However, unlike the preceding exemplary embodiment, the receiver adaptor 12 in this case is not made of a transparent material and is therefore opaque to the laser beam 15. However, as a result of the specific shape of the attachments 18 in conjunction with a corresponding ability of the laser 14—as illustrated—to be positioned, it is nevertheless possible for a permanent interlocking connection to be created between the ear mold 11 and the receiver adaptor 12.

Figure 4:
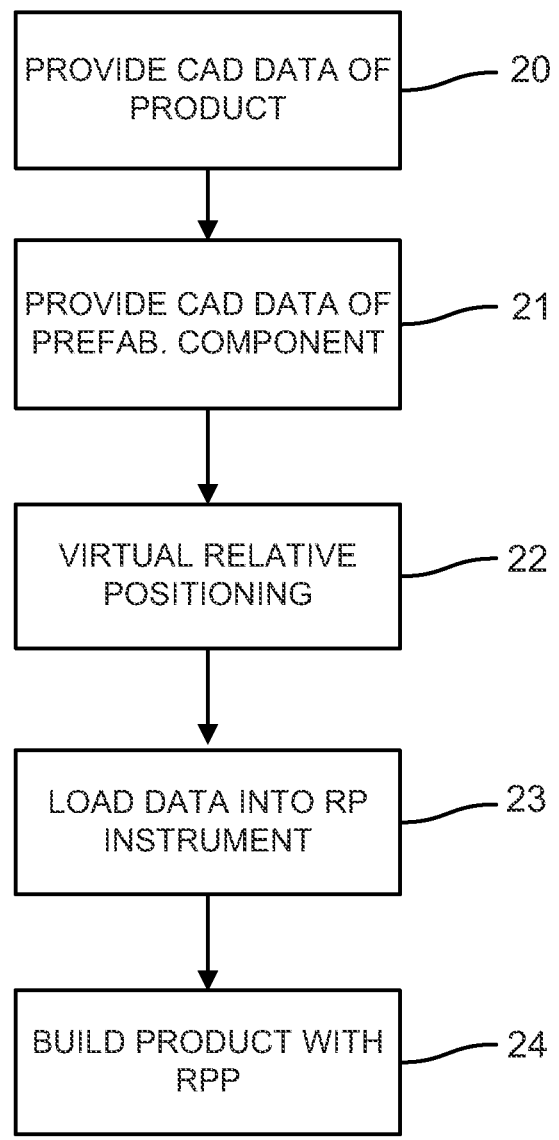
FIG. 4 shows a flowchart of a production method according to the invention.

For further clarification, FIG. 4 highlights the primarily important method steps of the invention.

In the method according to the invention for producing by means of a rapid prototyping method a housing shell or an ear mold to be worn in the ear, CAD data of a three-dimensional shape of the housing shell or ear mold is first of all provided in a first method step 20. Likewise, CAD data of a three-dimensional shape of a prefabricated component to be connected to the housing shell or ear mold is provided in a further method step 21. Subsequently, there is a computer-aided virtual positioning of the component and the housing shell or ear mold with respect to each other in a method step 22. Since the housing shell or ear mold with an integrated component now exists as a 3D data record or computer model, the actual production process is now brought about. Here, in a rapid prototyping instrument for carrying out the rapid prototyping method, the component is first of all provided in a method step 23 such that the precise position and alignment of said component are available in a control arrangement of the rapid prototyping instrument. This is referred to as loading the data developed in steps 20-22 into the controller of a rapid prototyping instrument. The housing shell or ear mold is subsequently built in a method step 24 by means of the rapid prototyping process (RPP) while at least partly embedding the component.

The invention claimed is:

1. A method for producing a housing shell or an ear mold to be worn in an ear, the method which comprises:
    providing CAD data of a three-dimensional shape of the housing shell or ear mold to be produced;
    providing CAD data of a three-dimensional shape of a prefabricated component to be connected to the housing shell or ear mold;
    subjecting the three-dimensional shape of the prefabricated component and the three-dimensional shape of the housing shell or ear mold to virtual positioning relative to one another;
    generating a three-dimensional data record of the three-dimensional shape of the prefabricated component integrated in the three-dimensional shape of the housing shell or ear mold based on the virtual positioning;
    loading the three dimensional data record into a rapid prototyping instrument;
    providing the prefabricated component and mounting the prefabricated component on a support in a container of the rapid prototyping instrument for forming the housing shell or ear mold by a rapid prototyping process, the prefabricated component being formed with at least one attachment or recess for generating a permanent interlocking connection with at least one corresponding attachment or recess of an inverted construction in the housing shell or ear mold, at least one of the attachment or the prefabricated component being formed, partially or completely, of transparent material for being transilluminated in regions of the attachment or recess during production of the housing shell or ear mold for allowing the housing shell or ear mold to be built up in a region otherwise shadowed from a laser beam by the prefabricated component;
    providing the support with positioning aids;
    automatically recognizing the position of the support and the prefabricated component based on the positioning aids;
    penetrating the laser beam through the transparent material to cure a liquid in the container in the regions otherwise shadowed by the attachment or prefabricated component; and
    building the housing shell or ear mold with the rapid prototyping process and thereby embedding the prefabricated component at least partly.

2. The method according to claim 1, which comprises applying a connecting layer onto the prefabricated component for connecting the prefabricated component to the housing shell or ear mold.

3. The method according to claim 2, wherein the connecting layer is an adhesive or lacquer.

4. The method according to claim 1, wherein the prefabricated component is a frame for attaching an electronics module.

5. The method according to claim 1, wherein the prefabricated component is a receiver adapter for connecting to a receiver.

* * * * *